United States Patent Office 3,819,715
Patented June 25, 1974

3,819,715
PRODUCTION OF METHACROLEIN
Wilhelm Vogt, Hurth-Efferen, and Hermann Glaser, Erfstadt Lechenich, Germany, assignors to Knapsack Aktiengesellschaft, Knapsack, near Cologne, Germany
No Drawing. Filed Nov. 8, 1971, Ser. No. 196,806
Claims priority, application Germany, Nov. 9, 1970, P 20 54 988.6
Int. Cl. C07c 47/20
U.S. Cl. 260—601 R                       5 Claims

ABSTRACT OF THE DISCLOSURE

Methacrolein is produced by heating a diacetoxyisobutene together with water in the presence of an acid and distilling off resulting methacrolein. The methacrolein is formed by hydrolysis coupled with separation of acetic acid.

---

The present invention relates to the production of methacrolein.

Unsaturated aldehydes are valuable starting materials for use in organic syntheses. Methacrylic acid, for example, can be produced by oxidizing methacrolein. Various processes for the production of methacrolein have already been described. Some of these earlier processes produce unsatisfactory yields and some other processes fail to be commercially attractive procedures because of the use of too costly starting material therein. The process of the present invention now permits the production of methacrolein in especially high yields from diacetoxyisobutenes, which in turn can readily be produced from methallyl acetate, as reported in German published Applications 1945528 and 1945529.

German published Application 1964085 describes a process, wherein isobutene, acetic acid and molecular oxygen are reacted in contact with a palladium catalyst to produce methallyl acetate in good yields. In the two German Applications first referred to hereinabove, it is further reported that methallyl acetate can be subjected to further reaction with acetic acid and molecular oxygen in contact with palladium catalysts to produce an isomeric mixture of diacetoxyisobutenes. This isomeric mixture consisting of (1)
$$CH_2=C-CH\begin{matrix}OOCCH_3\\OOCCH_3\end{matrix}$$
$$\quad\quad |$$
$$\quad\quad CH_3$$

2-methyl-3,3-diacetoxypropene-(1)

(2)
$$CH_3COO-CH=C-CH_2OOCCH_3$$
$$\quad\quad\quad\quad\quad\quad |$$
$$\quad\quad\quad\quad\quad\quad CH_3$$

2-methyl-1,3-diacetoxypropene-(1)

(3)
$$CH_2=C-CH_2OOCCH_3$$
$$\quad\quad |$$
$$\quad\quad CH_2OOCCH_3$$

2-methylene-1,3-diacetoxypropane contains more than 90% of 2-methylene-1,3-diacetoxypropane as its principal fraction.

On subjecting all of the diacetoxyisobutenes specified hereinabove to hydrolytic splitting in accordance with this invention, methacrolein is obtained substantially in quantitative yield.

This is illustrated by the following equation of formulae with the use of 2-methylene-1,3-diacetoxypropane.

$$CH_2=C-CH_2OOCCH_3 + H_2O \longrightarrow$$
$$\quad\quad |$$
$$\quad\quad CH_2OOCCH_3$$

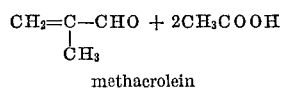

methacrolein

The present invention relates more particularly to a process for making methacrolein, comprising heating a diacetoxyisobutene together with water in the presence of an acid and distilling off resulting methacrolein, this latter compound being formed by hydrolysis coupled with separation of acetic acid.

Further preferred features of the present invention, which may be used singly or in combination, provide:

(a) for the diacetoxyisobutene to be selected from 2-methyl-3,3-diacetoxypropene-(1), 2 - methyl-1,3-diacetoxypropene-(1), 2-methylene-1,3-diacetoxypropane or a mixture thereof;

(b) for the hydrolysis to be effected in the presence of zinc, cadmium, mercury or iron ions;

(c) for the acid to be selected from sulfuric acid, phosphoric acid, an organic sulfonic acid or phosphonic acid, and for the acid to be used in a proportion of between 0.5 and 15 weight percent, based on the diacetoxyisobutene used;

(d) for the acetic acid split off during hydrolysis to be used in the process, if desired under elevated pressure;

(e) for the hydrolysis to be effected in the presence of between 0.0001 and 0.2 weight percent, based on the diacetoxyisobutene used, of a polymerization inhibitor, such as phenothiazine, hydroquinone, pyrogallol, p-tert.-butyl pyrocatechol.

The zinc, cadmium, mercury or iron ions may be used in the form of metal salts, for example as sulfate ($ZnSO_4$, $CdSO_4$, $HgSO_4$, $Fe_2(SO_4)_3$ to accelerate the hydrolysis to give methacrolein. The acetic acid formed during hydrolysis has an autocatalytic effect upon the further hydrolysis of the bulk of diacetoxyisobutene used.

The hydrolysis should conveniently be effected in a standard distilling column. In the column base, the diacetoxyisobutenes are reflux heated, for example, together with water and a heavy metal salt in sulfate form. The heating step may be effected in the further presence of a mineral acid or organic sulfonic acid or phosphonic acid, which, however, should be introduced into the column prior to the reaction components. The useful organic sulfonic acids include, for example, p-toluene-sulfonic acid and benzene-sulfonic acid, and the useful phosphonic acids include alkylphosphonic acids having from 1 to 20 carbon atoms in the alkyl radical, alkenyl or arylphosphonic acids, e.g. ethyl or vinylphosphonic acid. The resulting methacrolein is continuously removed from the head of the column. A small proportion of a stabilizer, for example hydroquinone, should conveniently be added to the methacrolein removed from the column, more preferably to the material in the base of the distilling column, so as to avoid undesirable polymerization of methacrolein.

EXAMPLE 1

172 Grams (=1 mol) of an isomeric mixture of diacetoxyisobutenes, which was produced by the reaction of methallyl acetate with acetic acid and molecular oxygen in contact with a palladium catalyst followed by distillative work-up, was reflux-heated together with 200 grams of water, 1 gram of $HgSO_4$ and 10 grams of 86% sulfuric acid in a flask having a distilling column mounted thereon (the temperature in the column base was maintained between about 95 and 105° C.). The base and receiver of the column were each fed with 0.2 gram of hydroquinone, to avoid the polymerization of methacrolein. 66.5 grams of methacrolein in the form of an azeotrope with water were removed within 6 hours near the head of the column at a temperature of between 63 and 70° C. This corresponded to a yield of 95%, based on the theoretical. The methacrolein was analyzed and found to be practically free from by-products.

EXAMPLES 2, 3 AND 4

The procedure was the same as that described in Example 1 save that the HgSO₄ heavy metal sulfate was replaced by CdSO₄, ZnSO₄ and Fe₂(SO)₃, respectively. The yields corresponded to the yield obtained in Example 1.

EXAMPLE 5

The procedure was the same as that described in Example 1. HgSO₄ was used but the sulfuric acid was omitted. The hydrolysis was found initially to proceed very reluctantly. It did accelerate, however, as the quantity of acetic acid increased, and it was complete after 24 hours. Methacrolein was produced in a yield of 98%, based on the theoretical.

EXAMPLE 6

Diacetoxyisobutenes together with water were reflux-heated in the absence of mineral acid and heavy metal salt. Methacrolein was found to form very reluctantly, and only minor amounts of methacrolein were obtained after 20 hours. By operation of the column at elevated pressure, it was possible to achieve technically useful reaction velocities. Under a pressure of 4 atmospheres gauge, corresponding to a temperature of between 150 and 155° C. in the base of the column, it was possible to effect a conversion rate of 60%, based on the theoretical, after 20 hours.

EXAMPLE 7

The procedure was the same as that described in Example 1, save that it was carried out in the absence of HgSO₄. The reaction proceeded more reluctantly. After 10 hours, methacrolein was obtained in a yield of 94%, based on the theoretical.

The claims:

1. A process for the manufacture of methacrolein, comprising reflux heating a diacetoxyisobutene together with water in the presence of an acid selected from the group consisting of sulfuric acid, phosphoric acid, acetic acid, p-toluene-sulfonic acid, benzene-sulfonic acid, ethyl phosphonic acid and vinylphosphonic acid, and distilling off resulting methacrolein.

2. The process as claimed in claim 1, wherein the diacetoxyisobutene is selected from the group consisting of 2-methyl-3, 3-diacetoxypropene-(1), 2-methyl-1, 3-diacetoxypropene-(1), 2-methylene-1, 3-diacetoxypropane and mixtures thereof.

3. The process as claimed in claim 1, wherein the hydrolysis is effected in the presence of zinc, cadmium, mercury or iron ions.

4. The process as claimed in claim 1, wherein the acid is used in a proportion of between 0.5 and 15 weight percent, based on the diacetoxyisobutene used.

5. The process as claimed in claim 1, wherein the hydrolysis is effected in the presence of between 0.0001 and 0.2 weight percent, based on the diacetoxyisobutene used, of a polymerization inhibitor selected from the group consisting of phenothiazine, hydroquinone, pyrogallol and p-tert.-butyl pyrocatechol.

References Cited

UNITED STATES PATENTS

| | | | |
|---|---|---|---|
| 3,400,161 | 9/1968 | Gleich et al. | 260—601 R |
| 3,162,514 | 12/1964 | Roelen et al. | 260—601 R |

FOREIGN PATENTS

| | | |
|---|---|---|
| 1,945,530 | 9/1969 | West Germany. |

OTHER REFERENCES

Chemical Abstracts, 53 (1959), p. 21635.

BERNARD HELFIN, Primary Examiner

D. B. SPRINGER, Assistant Examiner

U.S. Cl. X.R.

260—478, 541